United States Patent [19]

Sheen

[11] Patent Number: 4,669,561

[45] Date of Patent: Jun. 2, 1987

[54] MOTOR-DRIVEN CART TRANSMISSION MECHANISM

[76] Inventor: Shuenn T. Sheen, No. 107, Lien Cheng Road, Chung Ho City, Taipei, Hsien, Taiwan

[21] Appl. No.: 834,815

[22] Filed: Feb. 28, 1986

[51] Int. Cl.⁴ .............................................. B62D 51/04
[52] U.S. Cl. ................................. 180/19.1; 280/43.12
[58] Field of Search ................... 180/19.1, 19.2, 19.3, 180/15; 280/43.12

[56] References Cited

U.S. PATENT DOCUMENTS

| 3,143,358 | 8/1964 | Du Broff | 280/43.12 |
| 3,372,769 | 3/1968 | Jung et al. | 280/43.12 X |
| 3,380,546 | 4/1968 | Rabjohn | 180/15 |

FOREIGN PATENT DOCUMENTS

| 379572 | 8/1923 | Fed. Rep. of Germany | 180/19.1 |
| 1813693 | 6/1970 | Fed. Rep. of Germany | 180/19.1 |

*Primary Examiner*—John J. Love
*Assistant Examiner*—Mitchell J. Hill
*Attorney, Agent, or Firm*—Stoll, Wilkie, Previto & Hoffman

[57] ABSTRACT

A main transmission gear secured to the end of the main transmission shaft which transmits power to another shaft by engaging a bevel gear secured to that shaft. The power is subsequently transmitted to the driving wheel by means of a chain to two sprockets, one coaxial with the bevel gear, the other fixed to a central shaft to which the driving wheel has been secured. The driving wheel has a thick layer of rubber attached on its steel rim. This outer circumference of rubber will result in better friction between the driving wheel and the ground. Two steel front wheels, set on opposite sides of the driving wheel, each being set inside a wheel support which connects with the support leg of the cart. An adjustment screw which enables the relative elevation difference between the front wheel and the driving wheel to be adjusted so as to increase the driving force of the driving wheel. This transmission mechanism hence can efficiently transmit power from the motor to the driving wheel.

1 Claim, 6 Drawing Figures

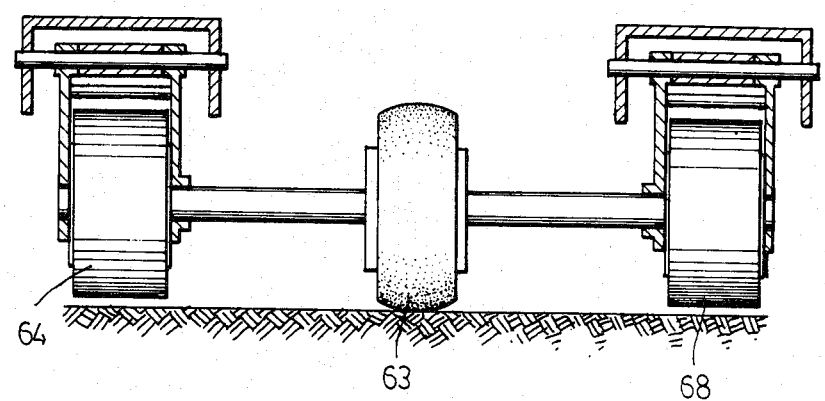
F I G . 5-A
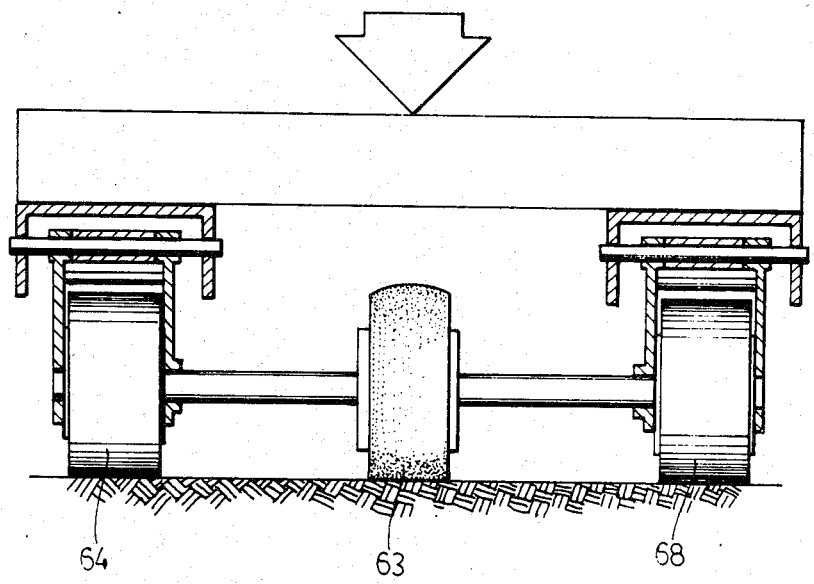
F I G . 5-B

MOTOR-DRIVEN CART TRANSMISSION MECHANISM

BACKGROUND OF THE INVENTION

This invention relates to a transmission mechanism of a motor-driven cart in which a motor is provided to generate power such that the gear system in the gear box is driven, thereby transmitting power to the main shaft which in turn moves the front driving wheel of the cart.

As a result of rapid growth of the economy, more and more automatic tools have been developed to improve the working environment.

Almost all factories need transporting mechanisms to transport goods, raw materials and final products from place to place within their work sites. For better efficiency, more efficient means must be applied. Conventional hand-carts, as shown in FIG. 5 are operated manually and may require the person using the carts to expend large amounts of energy if a heavy load must be transported from one place to another. This could be tiring and unsuitable for practical use.

Another conventional type of hand-cart is the battery operated type. The battery generates current which in turn can be used to drive the hand-cart. Although the battery driven hand-cart requires less manpower than a manually driven cart, the battery needs to be recharged occasionally, wasting time and possibly slowing operations in the plant.

SUMMARY

A primary objective of this invention is to overcome the above-mentioned shortcomings of previous hand-cart models.

Another objective of this invention is to provide a transmission mechanism for a motor-driven cart.

A further objective of this invention is to provide a means of making a motor-driven cart more practical and less expensive.

Further objectives and advantages of the present invention will become apparent as the following description proceeds, and the features of novelty which characterize the invention be pointed out with particularity in the claims annexed to and forming a part of this invention.

BRIEF DESCRIPTION OF THE DRAWINGS

FIG. 5-A is a schematic representation showing the relative position of the driving wheel and the other two front wheels with a light load or no load;

FIG. 5-B is a schematic representation showing the relative position of the driving wheel and the other two front wheels with a heavy load showing all three wheels in contact with the ground.

DETAILED DESCRIPTION OF THE PREFERRED EMBODIMENT

Figure 1:
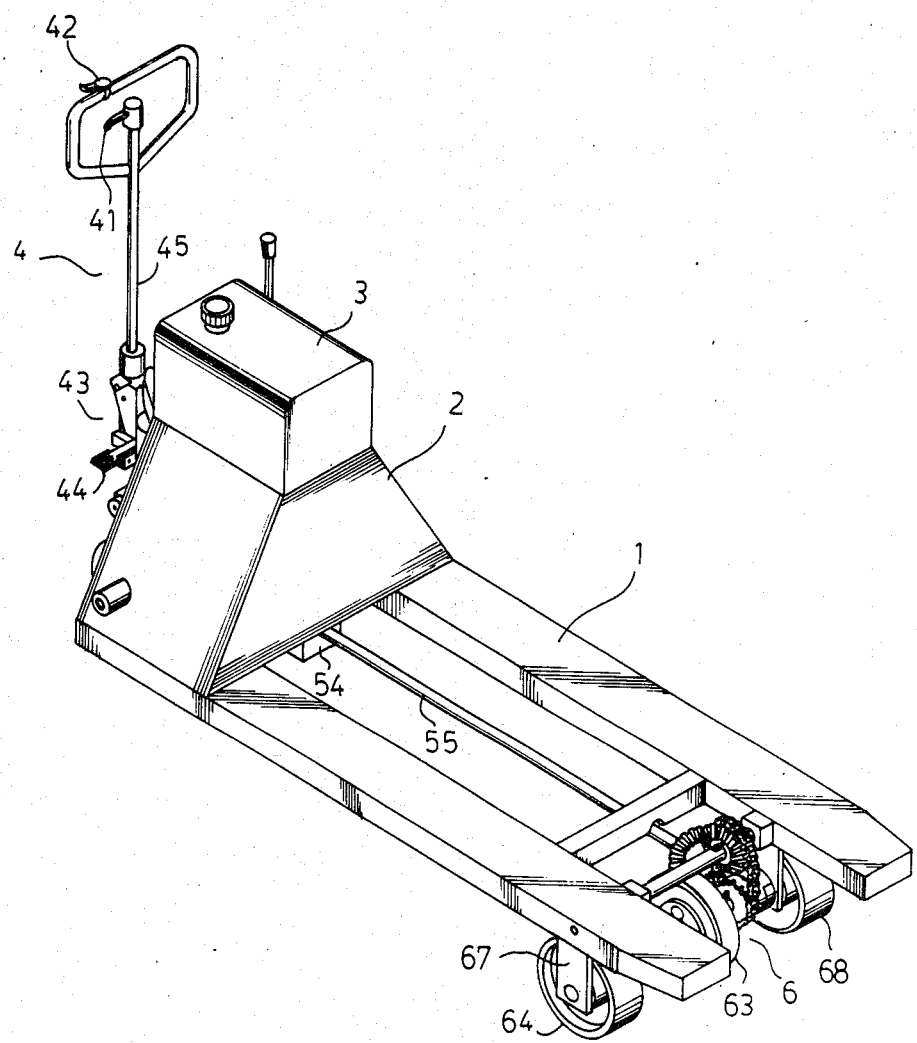
FIG. 1 is a perspective view of a motor driven cart with the present transmission mechanism.
Figure 2:
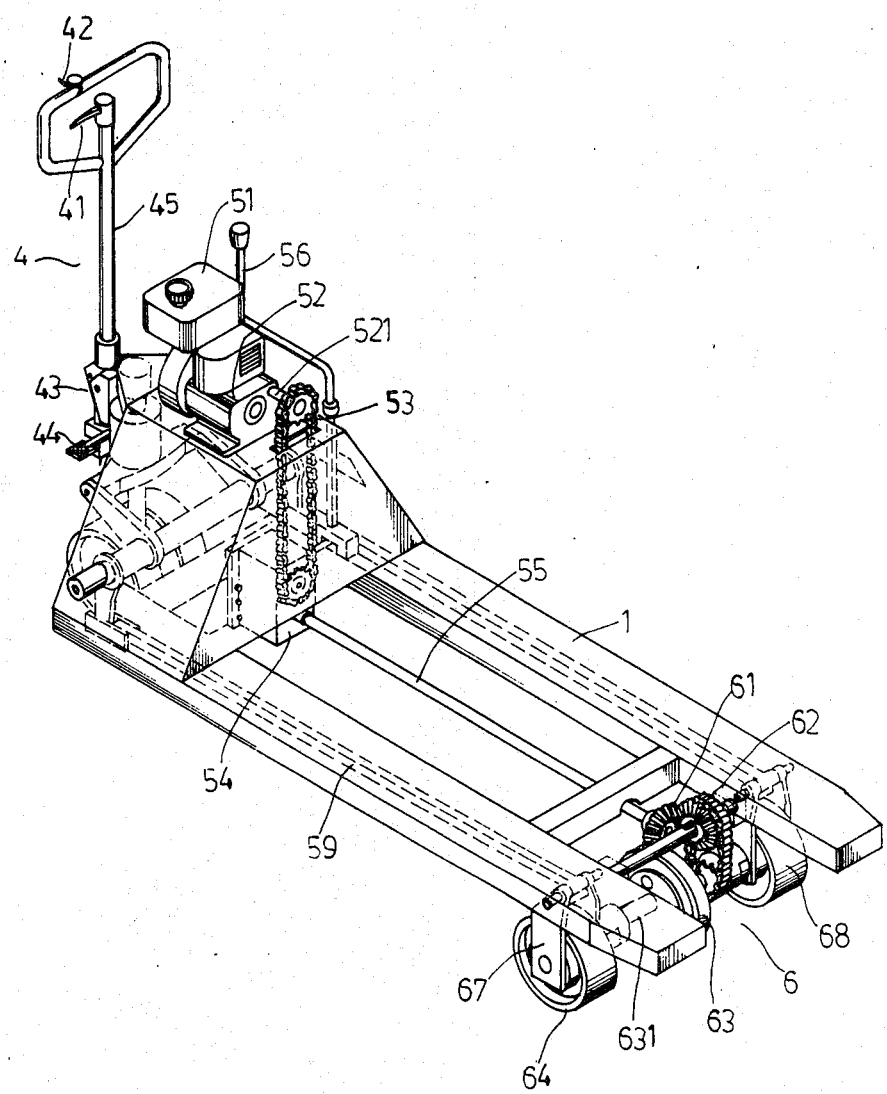
FIG. 2 is a more detailed view of the cart shown in FIG. 1.

Referring to FIGS. 1 and 2, it can be seen that a pair of parallel support legs 1 for supporting raw materials and/or products are close to the ground but are slightly higher than the front wheels 64 and 68. The transmission gear mechanism is contained within a mechanism housing 2 which is set on the rear side of said support legs 1. A motor 52 is secured on said mechanism housing 2 and is covered by a motor housing, which protects said motor 52.

A hydraulic control system is arranged in the rear part of the motored cart, behind the mechanism housing 2 and the motor housing 3. The hydraulic control system 4 comprises a hydraulic control switch 41, a hydraulic lifting device 43 and a hydraulic control pedal 44. The function of the hydraulic lifting device 43 is to lift the support legs 1. This process is controlled by the hydraulic control rod 45. Both the hydraulic control handle 41, which is set near the tip of said hydraulic control rod 45, and the hydraulic control pedal 44, which is positioned beside the hydraulic lifting device 43, are used to leak hydraulic pressure, thereby lowering said support legs 1. A rear wheel controls the direction of movement of the cart. The rear wheel, in turn, is controlled by the hydraulic control rod 45 and is positioned underneath the hydraulic lifting device 43.

Power from the motor 52 is transmitted through the motor shaft 521 to the transmission box 54 by a chain 53 positioned between two sprockets, one secured to said motor shaft 521 and the other secured to the transmission box 54. This transmission box 54 can work without a clutch, therefore the gear shifter 56 can independently control the output of said transmission box 54.

By referring to FIGS. 2 and 3, the characteristics of the front wheel transmission mechanism 6 of the present invention will be subsequently described in detail.

The main transmission shaft 55 extends from the transmission box 54. The main transmission gear 61 is fixed on the end of the main transmission shaft 55 to transmit power to the front wheel transmission mechanism 6. The main transmission gear 61 is a bevel gear which engages another bevel gear 62 which, in turn, provides a rotary output to the front wheels 64 and 68.

Figure 3:
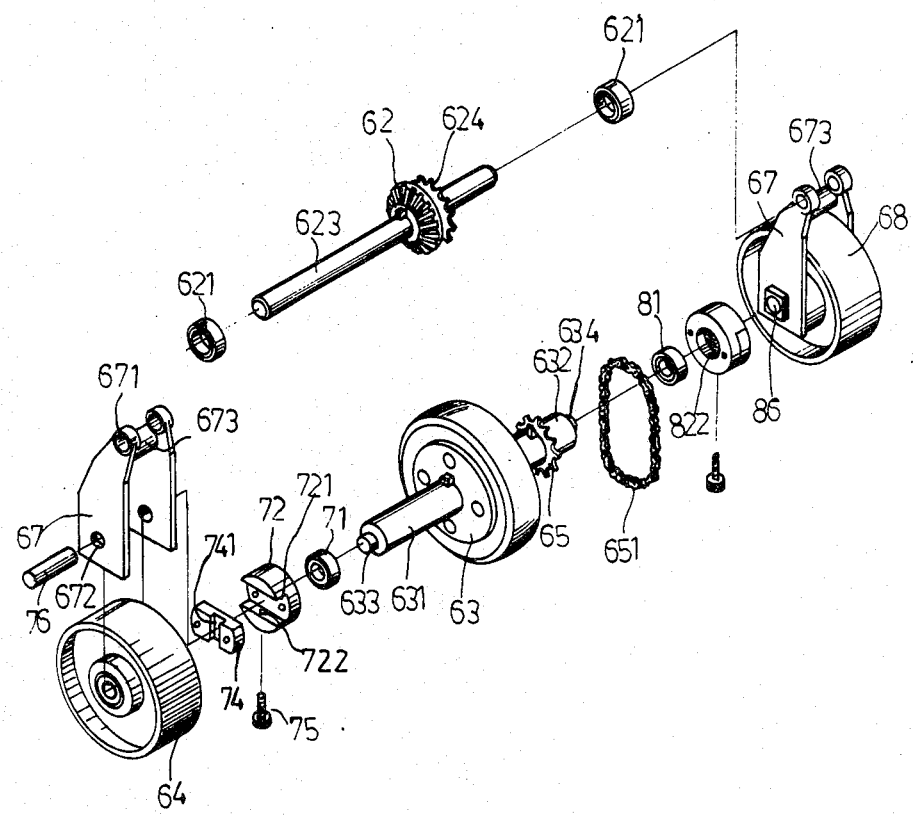
FIG. 3 is an exploded view of the transmission mechanism of the present invention.
Figure 4:
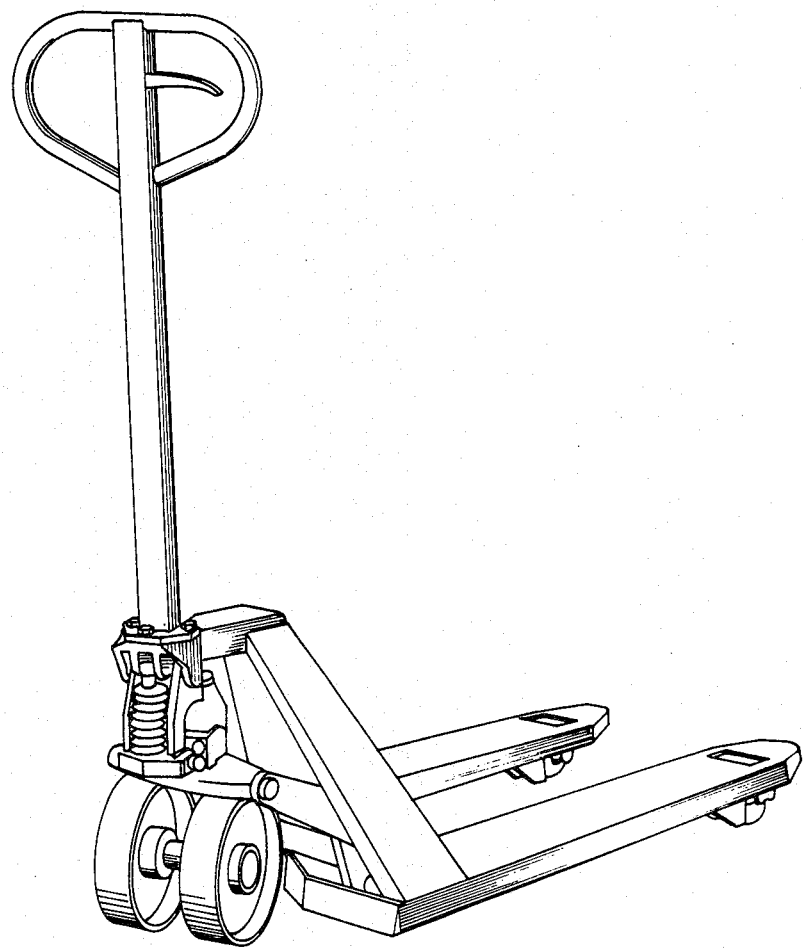
FIG. 4 is a perspective view of prior art of a hand-cart.

Referring to FIG. 3, the structure of the whole mechanism can be better understood. The front wheel transmission mechanism 6 (FIG. 2) comprises two axial systems. One axis is positioned higher in order to support the bevel gear 62 and a sprocket 624. The other axial system comprises three wheels and a number of relevant pieces.

The higher axial system comprises a support shaft 623, two bearings 621, a bevel gear 62 and a sprocket 624.

Said support shaft 623 is sleeved on either end by bearings 621 which are supported by the cylindrical bodies attached on the inside of the support legs 1. Furthermore, said bevel gear 62 which receives its power from the main transmission gear 61 and said sprocket 624 are fixed to the support shaft 623 with two fixing keys.

The driving wheel 63 is a steel wheel which has a thick layer of rubber on its outer rim. It is positioned in the center of the lower axial system. A central shaft goes through the hub of said driving wheel 63 and is thus divided into two parts; the left central shaft 631 and the right central shaft 632. Both ends of the shaft have column pins 633 and 634 which project axially from the ends and which allow the driving wheel 63 to be supported by bearings 71 and 81. Further, a sprocket 65 is also fixed to the right central shaft 632 with a key. A chain 651 attached to sprockets 624 and 65 transmits power to the sprocket 65 and hence to the driving wheel 63.

Due to the symmetry of the left and right sides of the shaft 631 and 632, hereafter only the left portion 631 will be introduced.

The adjustment base 72 is a cylindrical body wherein one face near the driving wheel 63 has a circular hold (refer to 822 in the right adjustment base) which contains a bearing 71 and the other face has a lateral engagement slot 721 for containing an assembly block 74. The assembly block 74 has a vertical slot 741 which matches the engagement slot 721 and is secured to said adjustment base 72. An adjustment screw hole 722 is set from the lowest circumference perpendicularly through the horizontal plane inside the engagement slot 721.

A wheel support 67 is made up of two plates with a column 673 between them. Two pin holes 671 are set on the tip of said wheel support 67, by which the wheel support 67 and the left bar 59 (see FIG. 2) are secured to the support leg 1 with a pin or the like. The lift bar 59 (FIG. 2) for lifting said support leg 1 is one part of the forementioned hydraulic mechanism. A steel front wheel 64, together with a bearing inside its hub, is fixed inside said wheel support 67 with a fixing pin 76 going through the pin hold 672 and the bearing of said front wheel 64. The adjustment base 72, together with the assembly block 74, is secured to the face of said wheel support near to said driving wheel 63. Accordingly, one end of said fixing pin 76 fits into a vertical space which basically comprises the vertical slot 741 with both upper and lower faces limited by the walls of the engagement slot 721 in said adjustment base 72. An adjustment screw 75, which adjusts the elevation difference between said fixing pin 76 and said central shaft 631 and 632 (this will be described later), will go through said adjustment screw hole 722 and subsequently contact the end of said fixing pin.

The constitution of the portion positioned on the right of the central shaft 632 is symmetrical and identical to the portion on the left side. It can be seen that the driving wheel 63 is the only wheel which drives the cart. Both the front wheels 64 and 68 are primarily used to support the load and to stabilize the movement of the cart.

FIGS. 5-A and 5-B schematically illustrates two important points about the present invention. FIG. 5-A shows the relative position between the driving wheel 63 and the two front wheels 64 and 68. FIG. 5-B shows how the relative elevation difference can be adjusted to increase the driving force. The diameter of the driving wheel 63 is larger than the diameter of the steel front wheels 64 and 68. Therefore when the cart is lightly loaded or is empty, neither of the front wheels 64 and 68 touch the ground. When the cart is heavily loaded, said front wheels 64 and 68 are forced to stand on the ground, thereby supporting the majority of the load. When the rubber on the outer rim of the driving wheel 63 wears away, the diameter of the driving wheel 63 is slightly greater than or equal to the diameter of the two front wheels 64 and 68. Because the force between the ground and the driving wheel 63 has been reduced due to the smaller circumference, the driving force from the driving wheel 63 will accordingly decrease. Now referring to FIG. 3, it can be seen that in order to obviate and mitigate such drawbacks, said adjustment screws 75 and 85 can be screwed deeper to lift said fixing pins 76 and 86 higher; i.e. both front wheels 64 and 68 will be adjusted higher to make said driving wheel 63 relatively lower and thereby increase its driving force.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A transmission mechanism of a motor-driven cart comprising:
    (a) a main transmission gear being a bevel gear secured to the end of the main transmission shaft for transmitting power from the transmission box,
    (b) a bevel gear, a sprocket and a support shaft with said support shaft supporting said bevel gear and said sprocket being supported by two bearings attached to two support legs of the cart, said bevel gear engaging with said main transmission gear, which is fixed to said support shaft with a key, said sprocket also being fixed to said support shaft with a key, said sprocket being the means of transmitting power out to a chain,
    (c) a driving wheel, a central shaft, a sprocket and said chain with said central shaft going through a hub of said driving wheel to be separated into two equal halves with each end of said shaft being a lesser-diameter column pin which fits a bearing, said driving wheel having a steel rim covered by a thick layer of rubber, said driving wheel also being fixed at the center of said central shaft with a key thereby enabling power to be transmitted to said central shaft and driving wheel by means of said chain,
    (d) two adjustment bases, two assembly blocks, two bearings and two adjustment screws with an adjustment base being a thick circular plate, one face of said circular plate having a horizontal engagement slot and a vertical adjustment screw hole, the other face of said circular face being set with a circular hole which contains said bearing for smoothly supporting said central shaft, each assembly block being adapted to fit said horizontal engagement slot, each assembly block also having a vertical slot for containing a pin for further securement to said adjustment base, each adjustment screw being screwed into said adjustment screw hole, thus being the means of adjusting the relative elevation difference between said driving wheel and two front wheels, and because of symmetry, the above-mentioned adjustment base, assembly block, bearing, and adjustment screw being identical on the right and left sides;
    (e) two wheel supports, two front wheels and two fixing pins with said wheel support being a two-plate structure together with a lateral column between said plates, the tip of which has two holes for securing to a support leg and a lift bar, each adjustment base together with each assembly block being secured to an inner face of each wheel support, each front wheel which is made of steel and secured with a bearing in the hub of said wheel support being fixed inside said wheel support with said pin, one end of said pin fitting into said vertical slot of said assembly block and thereby the relative elevation difference between said front wheel and said driving wheel being adjustable by said adjustment screw, and because of symmetry, the above-mentioned wheel support, front wheel and fixing pin all being identical on the right and left sides, and wherewith the power out of the transmission box being transmitted to said driving wheel, furthermore, the relative elevation difference between said driving wheel and said front wheels being adjustable for increasing the driving force of driving wheel.

* * * * *